July 28, 1936. F. J. BARTHOLOMEW 2,049,243
PRODUCTION OF SULPHURIC ACID FROM HIGH OIL ACID SLUDGES
Filed July 5, 1933 2 Sheets-Sheet 1
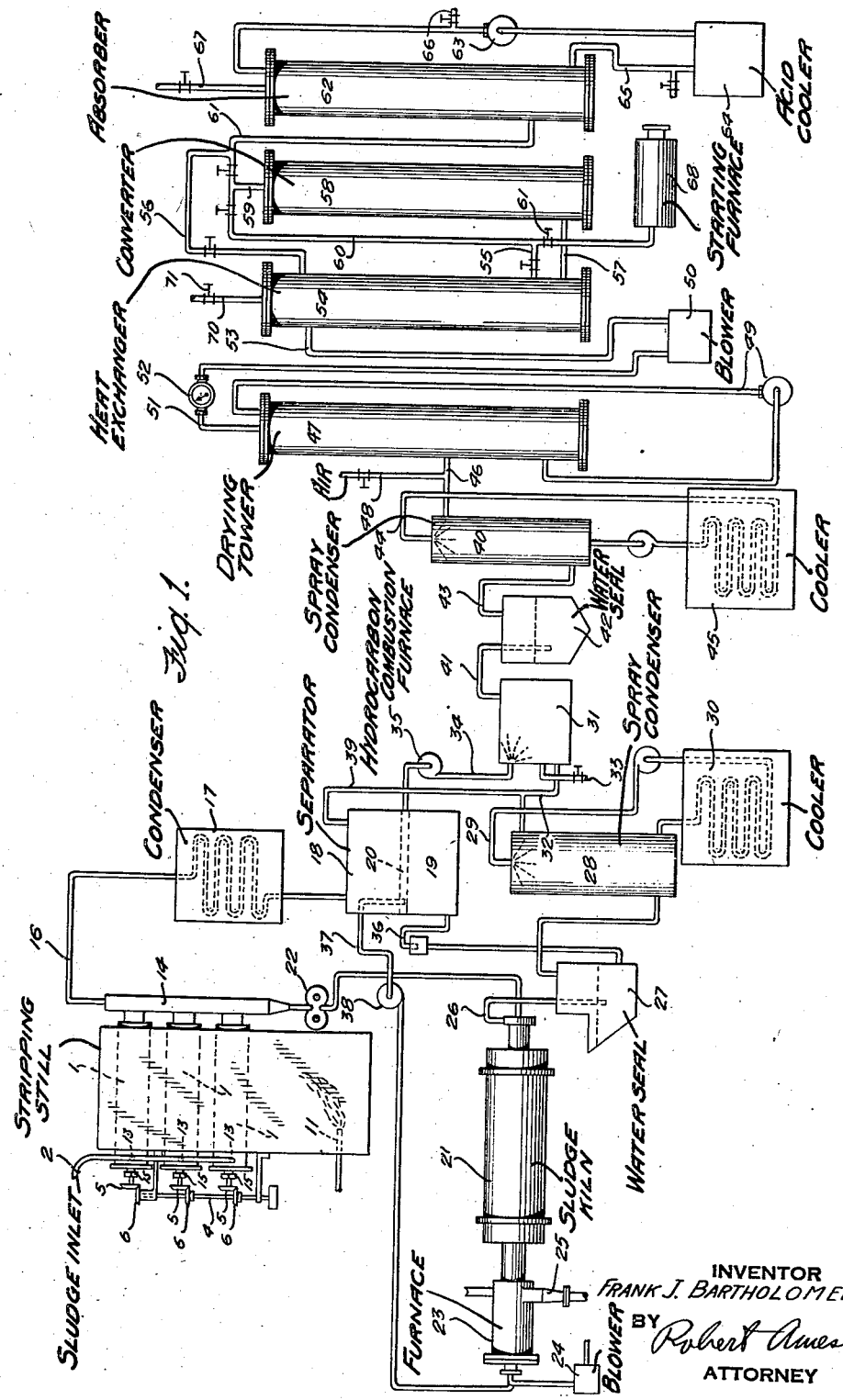

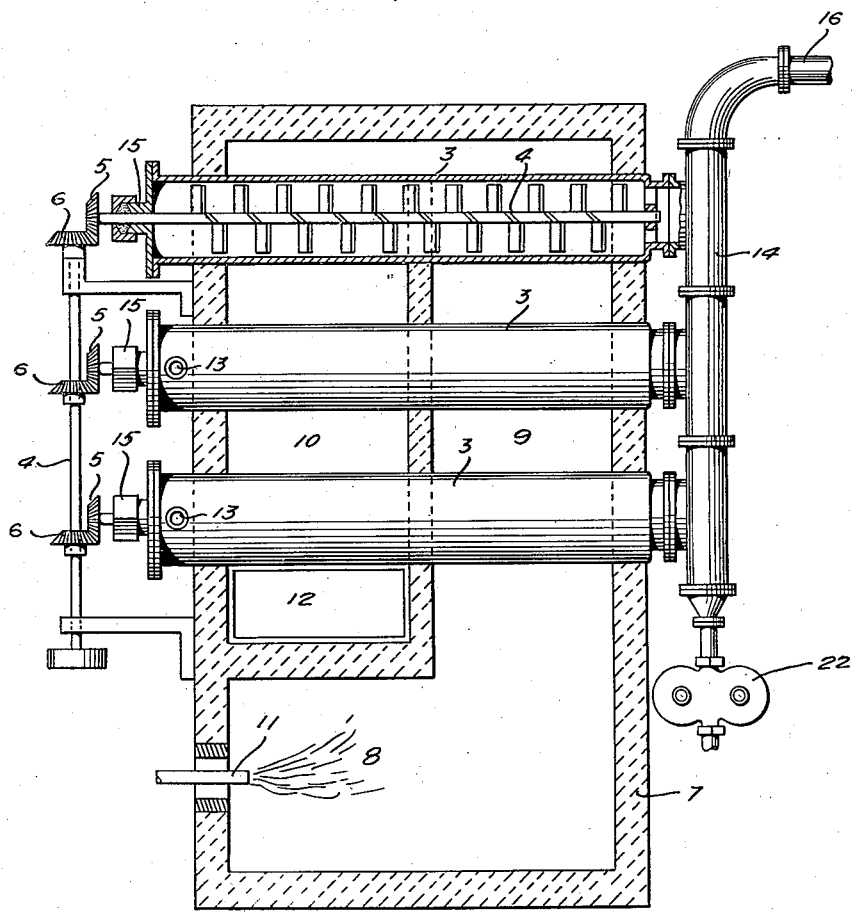

Patented July 28, 1936

2,049,243

UNITED STATES PATENT OFFICE 2,049,243

PRODUCTION OF SULPHURIC ACID FROM HIGH OIL ACID SLUDGES

Frank J. Bartholomew, Charlotte, N. C., assignor to Chemical Construction Corp., New York, N. Y., a corporation of Delaware Application July 5, 1933, Serial No. 679,023

1 Claim. (Cl. 23—177)

This invention relates to the production of sulphuric acid from high oil acid sludges.

The utilization of acid sludges from the sulphuric acid purification of petroleum and similar carbonaceous materials has presented a serious problem in the past. Methods involving the decomposition of the sludge with reduction of the $SO_4$ compounds to $SO_2$ proved commercially impracticable until the continuous sludge decomposition process invented by I. Hechenbleikner, (U. S. Serial No. 568,050, October 9, 1931), solved the problem for many types of acid sludge. The Hechenbleikner system usually requires partial or complete removal of hydrocarbons from the $SO_2$ gases obtained by the thermal decomposition of the acid sludge. In the original Hechenbleikner system the hydrocarbons are completely removed which may, for example, be effected by combustion of the uncondensable hydrocarbons as described in the pending application of Hechenbleikner and Mast, Serial No. 693,136, filed October 11, 1933. Other methods of dealing with the hydrocarbons are described in the pending applications of C. B. Clark, Serial Nos. 671,647 filed May 18, 1933, 670,123 filed May 9, 1933 and 674,489 filed June 6, 1933. All of these methods result in the transformation of the uncondensable hydrocarbons into water and carbon dioxide. These processes have proven very successful with acid sludges having relatively low oil content such as for example, sludges from the sulfuric acid treatment of certain mineral oil fractions for medicinal purposes. When, however, acid sludges high in oil are used in the Hechenbleikner process or in the modifications thereof, difficulties are encountered due to the large amount of $CO_2$ which is formed and the large amount of nitrogen introduced into the gases in the air used for combustion of the hydrocarbons. These seriously dilute the sulphur dioxide and reduce the efficiency of the conversion of the $SO_2$ into $SO_3$ from which sulphuric acid is formed.

The large amount of hydrocarbons given off when higher oil sludges are treated by the Hechenbleikner process and which have resisted removal by ordinary condensation were found to consist to a very considerable extent of hydrocarbons having a boiling point sufficiently high so that they ought to be readily condensable. The fact that they did not condense on investigation proved to be due to the fact that on cooling they formed a mist or fume which was carried on by the other gases.

According to the present invention it has been found that most of the hydrocarbons which are given off when high oil acid sludges are subjected to heat are readily condensable provided large quantities of air or other fixed gases such as nitrogen, carbon dioxide and the like are excluded. The present invention which is based on this surprising discovery avoids many of the difficulties encountered in the prior art when high oil acid sludges are to be treated. According to the present invention, high oil acid sludge is subjected to a preliminary distillation at low temperatures, for example, at temperatures somewhat above the boiling point of water. This distillation which is effected preferably in a continuous still with rigid exclusion of air and other fixed gases results in a distillation of the more volatile hydrocarbons and water together with a certain amount of decomposition of some of the $SO_4$ compounds to $SO_2$. The proportion of $SO_2$ formed, of course, is moderate because of the low temperature. The vapors when cooled condense readily with no mist formation, and the oil and water are recovered and the $SO_2$ with a very small percentage of uncondensable hydrocarbons can be utilized together with the $SO_2$ which is formed by further treatment of the sludge. The sludge from which the more volatile hydrocarbons and water have been stripped is then subjected to a thermal decomposition preferably at high temperatures in order to set free the maximum amount of $SO_2$. The sludge is of the character of very low oil sludges and can be used very effectively as a raw material for the Hechenbleikner process of sludge decomposition. It should be understood, however, that the present process is in no sense limited to the decomposition of the stripped sludge by the Hechenbleikner process. On the contrary, any other process may be used whether or not it involves the zone heating or direct internal firing features which are described by Hechenbleikner. Whatever the process used for decomposition of the stripped sludge into $SO_2$ the difficulties involved in formation of hydrocarbon mist are avoided or minimized and a more effective utilization of the $SO_2$ obtained for the production of sulphuric acid by the contact process is made possible.

It should be understood that in the present application the distillation of acid sludge with exclusion of air is not claimed broadly. Prior art processes have been described in which acid sludge is distilled with exclusion of air but in these processes the distillation or more properly decomposition has been effected in one step without preliminary stripping or without the conversion of $SO_2$ formed into sulphuric acid by the contact process. It is, of course, in systems in which sulphuric acid is obtained by the contact process, that the presence of excessive amounts of hydrocarbons are deleterious and it is to this type of system that the present invention is directed. While broadly the present invention is not limited to treatment of the stripped sludge by continuous processes of the internally heated type, such as the Hechenbleikner process described above, nevertheless it is of particular importance in its more specific aspects in connection with such continuous processes of the Hechenbleikner or modified Hechenbleikner type since it permits the enjoyment of the remarkable commercial efficiency of these processes with high oil acid sludges as well as with acid sludge of relatively low oil content to which up to the present time the commercial exploitation of the Hechenbleikner process has been limited.

Not only does the invention transform high-oil acid-sludges which are difficult to handle into low-oil acid-sludges which can be very effectively decomposed by processes such as the Hechenbleikner process but it is a simple matter to recover a large proportion of the oil from the vapors given off in the still. This oil in some cases can be commercially used, if desired, with further purification or rectification, or where the oil is not of sufficient value to warrant its further transformation into commercially salable products, it can be readily used as fuel to supply the heat required in the distillation and decomposition of the sludge. In the drawings which illustrate a specific installation this method of utilizing the oil is shown but, of course, the use made of the oil will depend on its character and on the particular market conditions. It is an advantage of the present invention that a large portion of the oil content of the sludge is recovered in a form in which it can be readily utilized. This gives a great flexibility to the invention and enhances the commercial attractiveness of plants employing it.

While the present invention is not strictly limited to any particular temperature in the preliminary still normally the temperature should be kept sufficiently low so that the stripped sludge when discharged is still in a fluid condition and can be effectively handled, for example, in introducing into a decomposing kiln or still in the Hechenbleikner process. Preferably the heating of the sludge in the preliminary still is gradual and may effectively be in a continuous process.

The slow heating of the sludge results in a distillation of a maximum of oil without producing excessive $SO_2$ or undesired side reactions. The continuous operation also readily permits discharging the sludge in a very uniform consistency and at a uniform temperature. This is of importance particularly when the sludge is further used in systems employing the Hechenbleikner process as that system is adjusted for a particular character of sludge and wide fluctuations in sludge composition tend to reduce the efficiency of the process. The greater uniformity of the sludge obtained from the preliminary still in the present invention is, therefore, of considerable advantage and it is desirable to operate the preliminary still in such a manner, preferably continuously, as to discharge a uniform sludge sufficiently fluid to be readily handled.

It should be noted that the present process requires heat in the preliminary distillation. Part of this heat, however, is recovered in the further steps because the sludge is discharged into the kiln of the Hechenbleikner process at a high temperature and thus decreases the amount of fuel necessary to heat the sludge up to the necessary decomposing temperatures. Where a simple Hechenbleikner process is employed using combustion gases from carbonaceous material this decreases markedly the amount of fuel which is to be burned in order to effect the decomposition of the sludge in the kiln. This not only saves fuel, but is more important in that it decreases the amount of carbon dioxide and nitrogen passed through the kiln in the form of combustion gases and as the dilution of the $SO_2$ gases with carbon dioxide and nitrogen is one of the difficulties encountered in the Hechenbleikner process. Even with low oil sludges, the present process not only delivers a sludge sufficiently low in oil to be handled but still further increases the concentration of the $SO_2$ gases.

The gases leaving the preliminary still contain as non-condensable components substantially sulfur dioxide with only a small amount of uncondensable hydrocarbons. After leaving the condenser, therefore, the gas is a highly concentrated $SO_2$ gas which may be used to fortify $SO_2$ gases from other sources where combined plants are employed, as for example, described in the application of C. B. Clark, U. S. Serial No. 671,647, above referred to. It is also of importance that a portion of the $SO_2$ is obtained in extremely concentrated form where it is desired to utilize a portion of the $SO_2$ for other purposes than the production of sulphuric acid. Thus, for example, if it is desired to obtain liquid $SO_2$ this is much easier from the concentrated $SO_2$ gases. Similarly, if it is desired to produce sulphur from a portion of the $SO_2$ gases, as described in the application of C. B. Clark, U. S. Serial No. 675,973, filed June 15, 1933, this concentrated $SO_2$ gas may be employed. In any event, so strong an $SO_2$ gas is very useful in controlling the balance in converters and gives a great flexibility to the entire process. When the strong $SO_2$ is mixed with sufficient air to provide the oxygen necessary for converting the $SO_2$ to $SO_3$, a gas is obtained which has a smaller amount of nitrogen than would a gas of the same $SO_2$ and oxygen content which is obtained by burning sulphur or sulphur bearing material, since the amount of nitrogen corresponding to the oxygen used in the combustion is then present. Because of the smaller amount of dilution with inert gas when strong $SO_2$ is mixed with air, it is not as necessary to remove as much of the hydrocarbons since the strong $SO_2$ will stand a larger dilution with carbon dioxide when the hydrocarbons are burned. Therefore the mixing of the strong $SO_2$ from the stripping still with the $SO_2$ from the sludge decomposition kiln permits satisfactory handling in the kiln of sludges having a higher oil content than would otherwise be possible or if the same type of sludge is used the conversion in the converter is improved and the converter size is decreased because of the smaller volume of gas. This results in greater flexibility in plant design and somewhat more efficient conversion to sulphuric acid. It also permits of considerable economy in converter size because converter size is dependent to a large extent on the volume of gases to be handled rather than on the $SO_2$ poundage actually present. This is an additional reason why extensive dilution by carbon dioxide and nitrogen in the ordinary Hechenbleikner process when applied to high oil sludges, has proven a considerable drawback.

In the drawings Fig. 1 shows an elevation of a typical installation combining a preliminary still with a Hechenbleikner acid sludge decomposition system; and Fig. 2 is a detailed section of the preliminary still on an enlarged scale, the same parts bearing the same reference numerals.

The high oil acid sludge is introduced into the preliminary still units 1, through the sludge inlet pipe 2. Each still unit consists of a cylinder 3 provided with an agitator and propeller 4, which is rotated from the shaft through the bevel gears 5 and 6. The still units are encased in a furnace 7 provided with a combustion chamber 8 and two passes 9 and 10. Oil, gas or other suitable fuel is introduced through the burner (shown diagrammatically at 11) and the combustion gases flow up over the rear portions of the sludge still units through the pass 9, then flowing down over the forward portions of the still units in the pass 10 and out through the flue 12.

The sludge entering at the side of each unit through the openings 13, is agitated and gradually propelled along the units by a rotation of the agitators 4, being discharged into the sludge discharge pipes 14. The sludge feed and agitator speed are so adjusted that by the time the sludge has passed through each unit the desired amount of hydrocarbons and water will have distilled off and the sludge will have reached the desired temperature. Entrance of air or other fixed gases into the still is prevented by the stuffing boxes 15 through which the shafts of the agitators 4 project. The gases formed consisting of hydrocarbons, water and $SO_2$ pass through the vapor takeoff pipe 16 flowing through the water cooled condenser 17 into the condensate receiver 18 where the condensed water and heavier hydrocarbons form a water layer 19 and an oil layer 20.

The hot sludge from the sludge pipe 14 is pumped into the Hechenbleikner rotary kiln 21 by means of the pump 22, the sludge flowing along the rotary kiln in countercurrent to hot combustion gases produced in the combustion furnace 23 which is fed with air by the blower 24. The combustion gases may be from the burning of carbonaceous material, or if desired, sulphur or sulphur bearing material may be burned in order to make up the loss of sulphuric acid in treating the oil; this latter amounting to some 10–25% in typical installations.

As the stripped hot sludge passes through the kiln in countercurrent to the combustion gases, it is gradually raised in temperature, resulting in a reduction of $SO_4$ compounds to $SO_2$, distillation of further amounts of hydrocarbons and some water produced mainly by the reduction of the $SO_4$ compounds by the hydrogen of sludge. In the end of the kiln the temperature reaches a sufficient figure to transform the sludge residue into a granulatable fuel which is discharged through the fuel discharge gate 25. Preferably the temperature zones in the kiln are maintained sufficiently low to prevent distillation of $SO_3$ and formation of $H_2S$. As the nature of the sludge is substantially the same as low oil sludges treated in Hechenbleikner sludge decomposition systems, the final temperature of the kiln may advantageously be maintained at about the figures described in the Hechenbleikner application above referred to. Since the sludge is introduced in a preheated form, however, the kiln may be somewhat shorter as a portion of the kiln which is normally used for preheating the cold sludge in a straight Hechenbleikner system is dispensed with.

The gases from the kiln lead through the pipe 26, bubbling through a water seal 27 and then flowing upwardly in a spray tower 28 in countercurrent to a spray of cold water or liquor from the pipe 29. The liquor at the bottom of the tower passes through the water-cooled cooler 30 and is recirculated. After leaving the spray condenser which removes a large part of the water and some of the remaining hydrocarbons, the $SO_2$ gas passes into the hydrocarbon combustion furnace 31 through the pipe 32. In this furnace sufficient heat is maintained to assure an ignition temperature of the hydrocarbons. Air is introduced through the valved air pipe 33 and sufficient oil or other combustible is pumped by the pump 35 through the pipe 34.

The oil and water layers 19 and 20 in the condensate receiver 18 are maintained at a predetermined level by the over flow pipe 36 through which the water layer continuously overflows into the water seal 27. Since the water layer 19 is at a temperature but little above that of the cooling water in the condenser 17, a considerable amount of sulphur dioxide is dissolved in this water. The temperature of the gases bubbling through the water seal 27 is, however, so high that very little, if any, $SO_2$ remains in the water seal. By replenishing the water seal from the water layer 19 all of the $SO_2$ contained therein is recovered and passes with the $SO_2$ from the kiln through the spray tower 28. From the oil level oil is removed either continuously or intermittently. This oil may be used for any desired purpose depending on its characteristics and on the particular conditions of the plant. Where the oil is not worth refining it may effectively be utilized as fuel for the sludge decomposition kiln and for the hydrocarbon combustion furnace. When so used the sulphur content of oil is transformed into $SO_2$ and recovered. This modification is illustrated in the drawings. Oil being pumped from the oil level into the furnace 23 by the pump 38 through the pipe 37 and another portion of the oil is pumped into the hydrocarbon combustion furnace through pipe 34.

The $SO_2$, free from most of the water and hydrocarbons, passes from the condensate receiver 18 through the pipe 39 into the pipe 32 where it joins the stream of $SO_2$ from the sludge kiln and passes through the hydrocarbon combustion furnace 31. After leaving the hydrocarbon combustion furnace 31 the gas stream passes through the pipe 41 into the spray tower 40 where a water spray is continuously circulated through pipe 44 and the cooler 45. The washed gases freed from condensable water, pass through the pipe 46 into the drying tower 47. If necessary, additional air is introduced through the valved pipe 48 in order to give the correct proportions of $SO_2$ and oxygen for the catalytic oxidation in the converter. Drying acid is circulated through the tower 47 by means of the pump 49 and the dried $SO_2$ gases are sucked from the top of the drying tower through the pipe 51 and flow meter 52 by means of the blower 50. From the blower the gases pass through the pipe 53 into the heat exchanger 54 where they are heated up by a flow of reacted gases from the converter which enter the heat exchanger at the bottom through the valved pipe 55 and leave at the top through the valved pipe 56.

The preheated gases pass from the bottom of the preheater to the bottom of the converter 58 through pipe 57. In the converter they are catalytically oxidized to sulphur trioxide and reacted gases pass out at the top of the converter through T 59 dividing into two branches, a portion flowing through valved pipe 60 into the pipe 55 and thence through the heat exchanger and a portion flowing directly through the valved pipe 61 into the absorber 62. The pipe 56 joints the pipe 61 just beyond the control valve in the latter. The united $SO_3$ gas stream passes through the absorber 62 where acid is circulated by the pump 63 through the cooler 64, fresh acid being introduced through the valved pipe 65 and acid being drawn off through valved pipe 66. The fixed gases leave the absorber through the valved pipe 67, passing up into a suitable stack.

Since the gases leaving the drying tower 47 are necessarily cold, it would be impossible to start up the converter without preheating the gases and for starting-up purposes the starting furnace 68 is provided which sends combustion gases into the pipe 55, the flow being controlled by the valve 69. When starting up the valves in the pipes 56 and 60 are closed, valve 69 is opened and valve 71 in the exhaust stack 70 of the heat exchanger is likewise opened. The hot combustion gases from the furnace 68 flow through the heat exchanger until the $SO_2$ gas has reached a sufficient temperature so that the conversion can start in the converter. As soon as the converter is operating normally, valves 69 and 71 are closed and the valves in pipes 56 and 60 are opened and thereafter the heat exchanger operates normally on the hot gases from the converter.

The invention has been illustrated in the drawings in conjunction with a typical Hechenbleikner sludge decomposition system. The installation being shown for the most part in semi-diagrammatic form. It should be understood that this is merely an illustration of the preferred embodiment of the invention. The stripping still is useful with any suitable sludge decomposition system. Naturally, of course, the accessories such as the arrangement for drawing off water and oil from the condensate receiver and the like, will vary with the particular installations, and the arrangement shown in the drawing merely illustrates an application to a particular type of Hechenbleikner sludge decomposition system.

While a continuous stripping still is desirable and constitutes the preferred embodiment of the invention, it should be understood that any type of still may be used. Thus, for example, instead of a plurality of small stills, one large still may be employed. Continuous stripping stills, especially when subdivided into units of moderate size such as is illustrated for example in Fig. 2, which shows in diagrammatic form a stripping still suitable for treating some 25 to 40 tons of sludge a day, give particularly desirable results as they permit a very uniform and gradual heating throughout the sludge and operate smoothly and efficiently. Such stills give a stripped sludge of very uniform composition and temperature and are a very desirable type for use in large plants, but it should be understood that the invention is not limited to this type of still and in some cases other types may present advantages.

The sulphuric acid production is shown in units which are effective with an ordinary Hechenbleikner sludge decomposition system. Where modified decomposition systems are shown, such as, for example, those described in some of the Clark applications above referred to, the sulphuric acid conversion units require some rearrangement and of course the invention is in no sense limited to the particular arrangement of conversion units shown in the drawings.

In the modification illustrated in the drawings the $SO_2$ from the stripping still is mixed with the $SO_2$ from the kiln and both are passed on to the hydrocarbon combustion furnace. Where a modification of the Hechenbleikner system is used as described in the Hechenbleikner Patent No. 1,900,239, March 7, 1933, or in the copending application of Gilchrist and Rumple, Serial No. 701,138 filed December 6, 1933, in which the gases from the kiln are recirculated through the combustion furnace the $SO_2$ from the stripping stills may likewise be introduced directly into the combustion furnace. Other modifications are, of course, also possible and it is an advantage of the present invention that it can be utilized with a wide variety of sludge decomposition processes.

What I claim is:

A method of producing sulphuric acid from acid sludge of high oil content obtained from the sulphuric acid purification of hydrocarbonaceous material which comprises subjecting the sludge to distillation at low temperature with the exclusion of fixed gases and added solvent for hydrocarbons in order to strip off volatile hydrocarbons and water with concomitant reduction of some of the $SO_4$ content of the sludge to $SO_2$, condensing the vapor from the distilling operation to form an oil and water layer and a fixed gas consisting essentially of $SO_2$ and small amounts of uncondensable hydrocarbons, introducing the stripped sludge without treating with solvents for hydrocarbons into a kiln, subjecting it to a thermal decomposition by means of direct contact with substantially inert heating gases, the heating being effected gradually at such temperatures as to result in the reduction of the remaining $SO_4$ compounds to $SO_2$ without substantial distillation of $SO_3$ and formation of $H_2S$, passing the $SO_2$ gas thus formed through a water seat without substantial reduction in temperature and introducing the water layer condensed from the vapors of the stripping operation into the body of water in the water seal whereby the $SO_2$ content of the water layer is recovered and admixed with the $SO_2$ from the kiln and subjecting the $SO_2$ gases after leaving the water seal and after adjusting the $SO_2$ and oxygen content to catalytic oxidation to $SO_3$ in a converter at reaction temperature.

FRANK J. BARTHOLOMEW.